United States Patent
Newberg et al.

(10) Patent No.: US 11,445,081 B2
(45) Date of Patent: *Sep. 13, 2022

(54) SLIDE RACK DETERMINATION SYSTEM

(71) Applicant: LEICA BIOSYSTEMS IMAGING, INC., Vista, CA (US)

(72) Inventors: Nicholas Newberg, San Marcos, CA (US); Prentash Djelosevic, Oceanside, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,844

(22) Filed: Jul. 20, 2020

(65) Prior Publication Data

US 2020/0351414 A1 Nov. 5, 2020

Related U.S. Application Data

(63) Continuation of application No. 16/201,989, filed on Nov. 27, 2018, now Pat. No. 10,721,368.
(Continued)

(51) Int. Cl.
*H04N 1/00* (2006.01)
*H04N 1/12* (2006.01)
*H04N 3/02* (2006.01)

(52) U.S. Cl.
CPC ..... *H04N 1/00721* (2013.01); *H04N 1/00771* (2013.01); *H04N 1/1225* (2013.01); *H04N 3/02* (2013.01); *H04N 2201/0406* (2013.01)

(58) Field of Classification Search
CPC .. H04N 1/00721; H04N 3/02; H04N 1/00771; H04N 1/1225; H04N 2201/0406
See application file for complete search history.

(56) References Cited

U.S. PATENT DOCUMENTS 7,278,328 B2 10/2007 Massaro
7,875,245 B2 1/2011 Favuzzi et al.
(Continued)

FOREIGN PATENT DOCUMENTS

AU 2018373404 B2 4/2021
CN 104903697 A 9/2015
(Continued)

OTHER PUBLICATIONS

International Search Report and Written Opinion dated Feb. 12, 2019 for related International Application No. PCT/US2018/062659, in 15 pages.
(Continued)

*Primary Examiner* — Zaihan Jiang

(57) ABSTRACT

A slide rack determination system for a digital slide scanning apparatus. In an embodiment, a motor drives a slide rack at a known rate toward an engagement surface. The elapsed time until engagement may be used to detect the presence or absence of the slide rack and/or the height of the slide rack. In addition, one or more sensors may detect one or more features of the slide rack, and these feature(s) may be used to determine the presence or absence of a slide rack, whether usage of the slide rack is supported or unsupported by the digital slide scanning apparatus, the orientation of the slide rack, and/or the manufacturer and/or model of the slide rack.

14 Claims, 5 Drawing Sheets

Related U.S. Application Data

(60) Provisional application No. 62/591,103, filed on Nov. 27, 2017.

(56) References Cited

U.S. PATENT DOCUMENTS

| | | | |
|---|---|---|---|
| 7,936,912 B2 | 5/2011 | Tohma et al. | |
| 7,982,170 B2 | 7/2011 | Hattori et al. | |
| 8,083,995 B2 | 12/2011 | Tsutsumida et al. | |
| 8,252,233 B2 | 8/2012 | Tokieda et al. | |
| 8,277,729 B2 | 10/2012 | Matsuo et al. | |
| 8,329,427 B2 | 12/2012 | Heid et al. | |
| 8,431,078 B2 | 4/2013 | Schutze et al. | |
| 8,501,121 B1 | 8/2013 | Ulbrich et al. | |
| 8,647,836 B2 | 2/2014 | Heid et al. | |
| 8,731,709 B2 | 5/2014 | Tatsutani et al. | |
| 8,752,440 B2 | 6/2014 | Tatsutani et al. | |
| 9,046,506 B2 | 6/2015 | Muller et al. | |
| 9,146,217 B2 | 9/2015 | Nakano | |
| 9,244,086 B2 | 1/2016 | Yao et al. | |
| 10,330,666 B2 | 6/2019 | Gofman | |
| 2004/0114227 A1 | 6/2004 | Henderson et al. | |
| 2004/0134750 A1 | 7/2004 | Luoma, II | |
| 2006/0010744 A1* | 1/2006 | Schumacher | F41C 27/00 |
| | | | 42/1.01 |
| 2006/0012773 A1 | 1/2006 | Schutze et al. | |
| 2006/0238846 A1* | 10/2006 | Alexander | G01N 21/4788 |
| | | | 359/198.1 |
| 2008/0024268 A1 | 1/2008 | Wong et al. | |
| 2008/0240613 A1* | 10/2008 | Dietz | G02B 21/367 |
| | | | 382/284 |
| 2009/0191095 A1 | 7/2009 | Nakamura | |
| 2011/0151504 A1 | 6/2011 | Avantsa et al. | |
| 2011/0162438 A1 | 7/2011 | Tokieda et al. | |
| 2011/0278444 A1* | 11/2011 | Navarro | A61N 5/1075 |
| | | | 250/252.1 |
| 2012/0127297 A1* | 5/2012 | Baxi | G06V 10/993 |
| | | | 382/173 |
| 2012/0290127 A1 | 11/2012 | Neef et al. | |
| 2013/0066192 A1* | 3/2013 | Sarvestani | A61B 17/3403 |
| | | | 600/424 |
| 2013/0228400 A1* | 9/2013 | Terry | B66B 1/285 |
| | | | 187/394 |
| 2015/0075298 A1 | 3/2015 | Hecht | |
| 2017/0325760 A1* | 11/2017 | Congy | A61B 6/505 |
| 2017/0332985 A1* | 11/2017 | Congy | A61B 6/0492 |
| 2017/0363936 A1* | 12/2017 | Yamahara | G03B 21/145 |
| 2018/0263579 A1* | 9/2018 | Lecuyer | A61B 6/032 |
| 2018/0344293 A1* | 12/2018 | Raju | A61B 8/085 |
| 2019/0100383 A1* | 4/2019 | Newberg | G01N 35/00029 |
| 2019/0101554 A1* | 4/2019 | Newberg | G01N 21/84 |

FOREIGN PATENT DOCUMENTS

| | | |
|---|---|---|
| CN | 111542742 A | 8/2020 |
| JP | H08-33849 A | 12/1996 |
| JP | 2003-202277 A | 7/2003 |
| JP | 2006-506672 A | 2/2006 |
| JP | 2010-054473 A | 3/2010 |
| JP | 2012 242 384 | 12/2012 |
| JP | 2017-508158 A | 3/2017 |
| JP | 2021-504679 A | 2/2021 |
| WO | WO 2019/104342 A1 | 5/2019 |

OTHER PUBLICATIONS

Extended European Search Report dated Jan. 19, 2021 for related European Patent Application No. 18881143.4, in 11 pages.

Office Action in Chinese Application No. 201880070069.8 dated Apr. 2, 2021, in 12 pages.

Office Action in Japanese Application No. 2020-524835 dated Aug. 16, 2021, in 14 pages.

International Preliminary Report on Patentability dated Sep. 11, 2019 for related International App No. PCT/US18/062659, in 14 pages.

Decision to Grant dated Feb. 16, 2022; in Japanese Patent Application No. 2020-524835, filed May 7, 2020; 5 pages.

Decision to Grant, dated Oct. 28, 2021; in Chinese Patent Application No. 201880070069.8, filed Apr. 27, 2020; 5 pages.

* cited by examiner

300

SLIDE RACK DETERMINATION SYSTEM

CROSS-REFERENCE TO RELATED APPLICATIONS

This application is a continuation of U.S. patent application Ser. No. 16/201,989, filed on Nov. 27, 2018, which claims priority to U.S. Provisional Patent App. No. 62/591,103, filed on Nov. 27, 2017, which are both hereby incorporated herein by reference as if set forth in full.

BACKGROUND

Field of the Invention

The present invention relates generally to a digital slide scanning apparatus (e.g. for pathology), and, more particularly, to a system for determining a type (e.g., manufacturer, model, etc.) and/or orientation of a slide rack, prior to the scanning of individual glass slides by a digital slide scanning apparatus.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster, and cheaper diagnosis, prognosis, and prediction of important diseases, such as cancer.

Glass slides that are processed by a digital slide scanning apparatus are very fragile and highly valuable. Glass slides may be stored in a variety of different types of slide racks that are made by different manufacturers. The characteristics of an individual slide rack, made by a first manufacturer, can significantly vary from the characteristics of an individual slide rack, made by a second manufacturer. This causes conventional digital slide scanners to damage glass slides. Therefore, what is needed is a system and method that overcomes these significant problems found in the conventional systems described above.

SUMMARY

Accordingly, in an embodiment, a slide rack determination system is described herein that operates within a digital slide scanning apparatus and confirms both the type and orientation of a slide rack, holding a plurality of glass slides, prior to scanning the individual glass slides on a scanning stage of the digital slide scanning apparatus. The system may include a slide rack clamp apparatus having a lower clamp and an upper clamp. The lower clamp engages a bottom surface of the slide rack. The lower clamp and slide rack are then driven towards the upper clamp until the upper clamp is engaged with a top surface of the slide rack. The lower clamp and slide rack are driven at a known (e.g., constant) rate, and consequently the time it takes for the upper clamp to engage the top surface of the slide rack provides an indication as to the height of the slide rack.

In an embodiment, the upper clamp comprises a plurality of sensors. The sensors on the upper clamp may be positioned to sense unique characteristics of slide racks from a given manufacturer. Accordingly, when the upper clamp engages the top surface of the slide rack, the individual sensor that is triggered, or the specific combination of sensors that are triggered, provide an indication as to the manufacturer of the slide rack and also provides an indication as to the orientation of the slide rack. Notably, many individual slide racks are strikingly uniform, and therefore it is not uncommon for a slide rack to be processed upside down. However, for digital slide scanning purposes, glass slides need to be processed topside-up. Thus, advantageously, the slide rack determination system may be configured to determine an upside-down orientation of a slide rack and generate an alert that will result in the slide rack not being processed by the digital slide scanning apparatus.

In an embodiment, a slide rack determination system is disclosed that comprises: a slide rack engagement surface configured to engage an engagement surface of a slide rack during processing of a slide rack by a digital slide scanning apparatus; one or more sensors configured to sense at least one feature of the slide rack while the engagement surface of the slide rack is engaged with the slide rack engagement surface; and at least one hardware processor configured to receive an output from the one or more sensors, and, based on the received output, identify the slide rack. Identification of the slide rack may comprise identifying a manufacturer of the slide rack, identifying a model of the slide rack, and/or determining whether or not usage of the slide rack is supported by the digital slide scanning apparatus.

The at least one hardware processor may be configured to, based on the received output, determine an orientation of the slide rack. In addition, the at least one hardware processor may be configured to: based on the received output from the one or more sensors, determine whether or not the orientation of the slide rack is improper; and, when the orientation of the slide rack is determined to be improper, initiate an alarm to alert an operator that the orientation of the slide rack is improper. The orientation of the slide rack may be determined to be improper when the orientation of the slide rack is upside-down.

In an embodiment, the slide rack determination system further comprises a motor configured to drive the slide rack along a linear axis within the digital slide scanning apparatus towards the slide rack engagement surface, wherein at least one of the one or more sensors is configured to sense an engagement between the slide rack engagement surface and the engagement surface of the slide rack, and wherein the at least one hardware processor is further configured to activate the motor, and, based on an output from the at least one sensor, deactivate the motor. The at least one hardware processor may be configured to: determine a time period between activation of the motor and the engagement between the slide rack engagement surface and the engagement surface of the slide rack; and determine a height of the slide rack based on the time period; wherein the identification of the slide rack is further based on the determined height of the slide rack.

The at least one feature may comprise a feature on a side of the slide rack, wherein the side is orthogonal to the engagement surface of the slide rack. Alternatively or additionally, the at least one feature may comprise a feature on a peripheral edge of the engagement surface of the slide rack. The one or more sensors may comprise a plurality of sensors configured to sense a plurality of features of the slide rack, wherein the output from the plurality of sensors comprises indications of the plurality of features, and wherein identifying the slide rack based on the received output from the plurality of sensors comprises identifying a slide rack that uniquely corresponds to all of the indications of the plurality of features.

In an embodiment, the slide rack determination system is comprised in a digital slide scanning apparatus. In such an embodiment, the at least one hardware processor may be configured to control an operation of a scanning process in the digital slide scanning apparatus based on the identification of the slide rack.

In an embodiment, a method is disclosed that comprises, by at least one hardware processor of a digital slide scanning apparatus: receiving output from one or more sensors configured to sense at least one feature of a slide rack while an engagement surface of the slide rack is engaged with a slide rack engagement surface of the digital slide scanning apparatus; and, based on the received output from the one or more sensors, identify the slide rack.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a slide rack determination system that determines the height and/or other features, manufacturer and/or model, and/or orientation of a slide rack being processed by a digital slide scanning apparatus. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Example Slide Rack Determination System

Figure 1A:
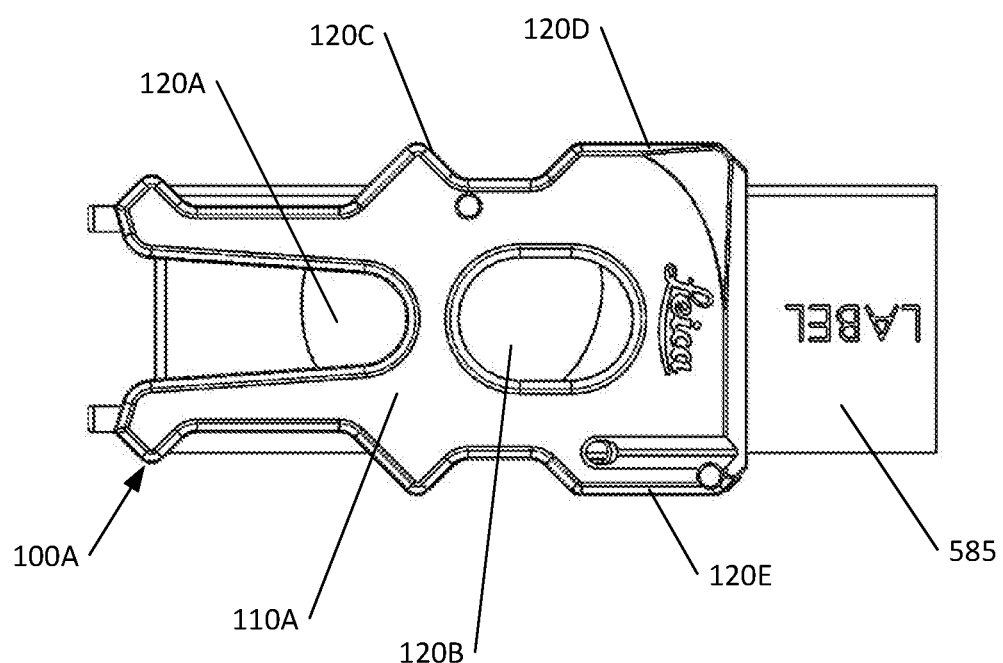
FIG. 1A is a top-view diagram illustrating an example slide rack with glass slides from a first manufacturer, according to an embodiment.

FIG. 1A is a top-view diagram illustrating an example slide rack 100A from a first manufacturer with glass slides 585, according to an embodiment. In the illustrated embodiment, the slide rack 100A comprises one or more slide rack features 120A-120E that are capable of being detected by a sensor, including two recesses 120A and 120B in the top surface 110A of the slide rack 100A.

Figure 1B:
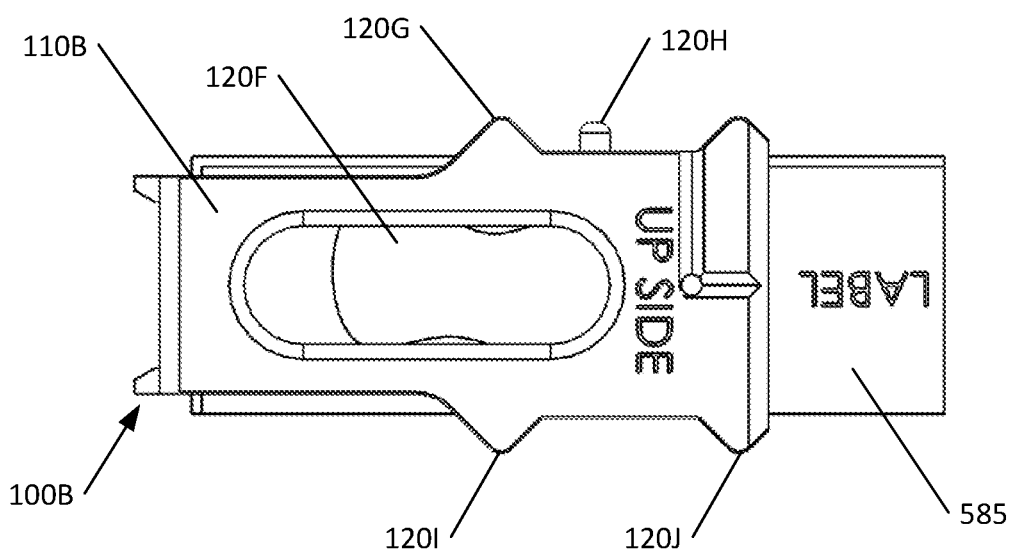
FIG. 1B is a top-view diagram illustrating an example slide rack with glass slides from a second manufacturer, according to an embodiment.

FIG. 1B is a top-view diagram illustrating an example slide rack 100B from a second manufacturer with glass slides 585, according to an embodiment. In the illustrated embodiment, the slide rack 100B comprises one or more slide rack features 120F-120J that are capable of being detected by a sensor, including a single recess 120F in the top surface 110B of the slide rack 100B.

A slide rack feature 120 may comprise a bump or other protrusion from a surface of the slide rack 100 at a particular location, a notch, opening, or other recess in a surface of the slide rack 100 at a particular location, the presence of a surface of the slide rack 100 at a particular location, the absence of a surface of the slide rack 100 at a particular location, and/or the like. In an embodiment, a single slide rack feature 120 may be used to uniquely identify a particular slide rack 100. Alternatively, a combination of a plurality of slide rack features 120 may be used, collectively, to uniquely identify a particular slide rack 100. Since a significant portion of the top surface 110 of the slide rack 100 may be covered when the slide rack 100 is engaged with a slide rack engagement surface of a clamp (e.g., upper clamp 200), it is preferable to use slide rack features 120 that are on a side of the slide rack 100 or near a perimeter edge of the top surface 110 of the slide rack 100 for easier detection.

Figure 2A:
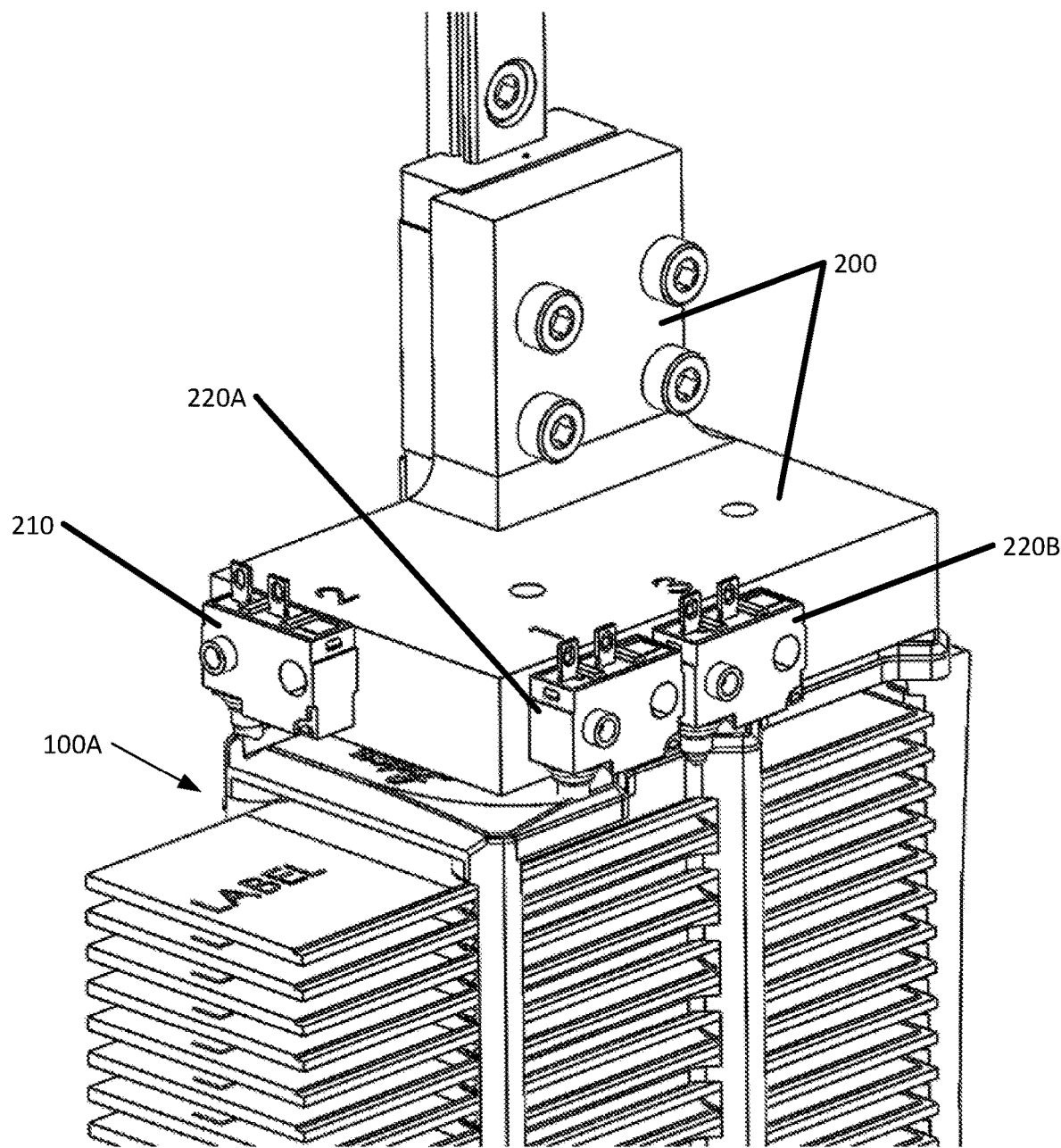
FIG. 2A is a perspective-view diagram illustrating an example slide rack from a first manufacturer engaged with an upper clamp, according to an embodiment.
Figure 2B:
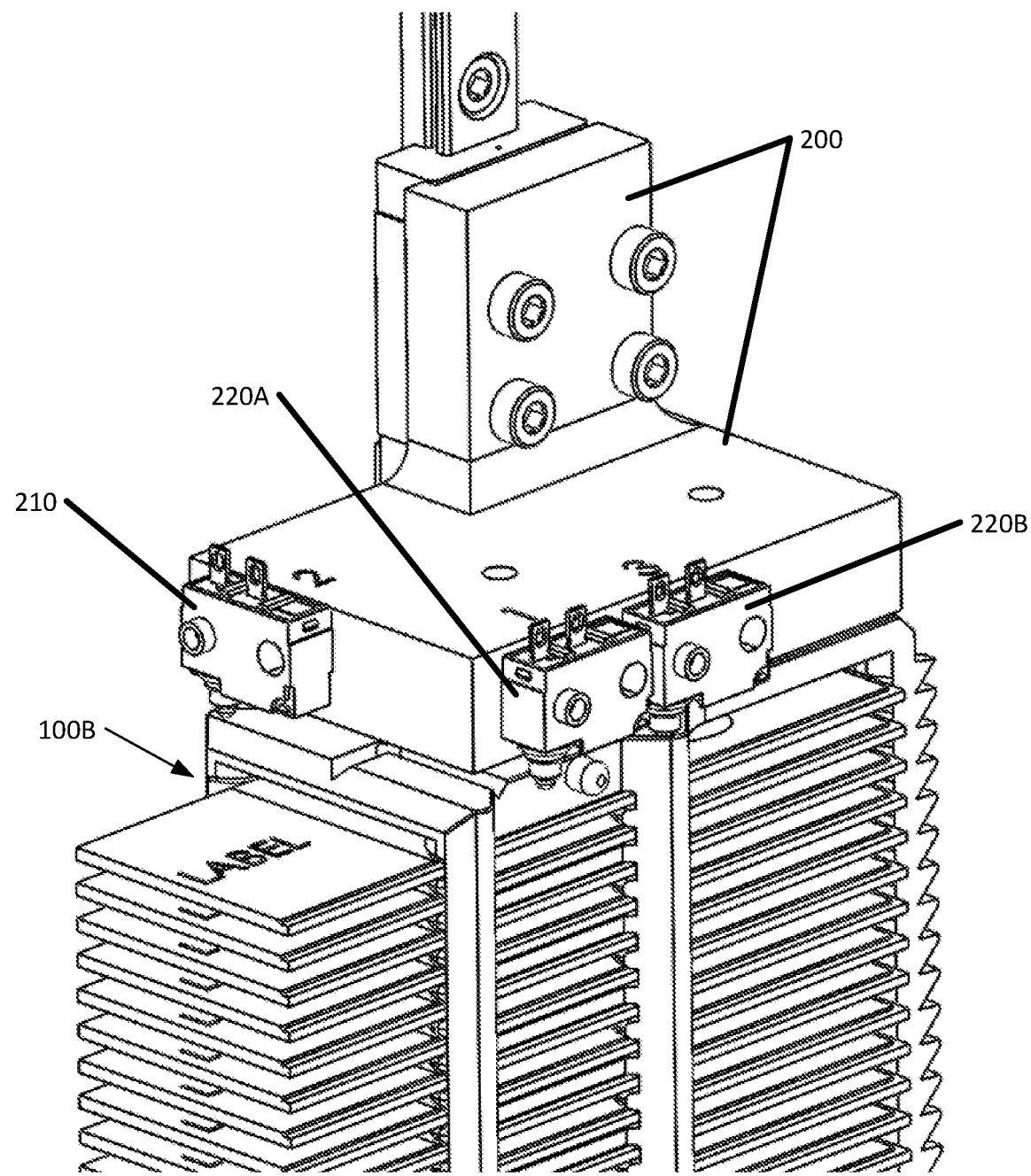
FIG. 2B is a perspective-view diagram illustrating an example slide rack from a second manufacturer engaged with an upper clamp, according to an embodiment.

FIG. 2A is a perspective-view diagram illustrating the example slide rack 100A from a first manufacturer, engaged with a slide rack engagement surface (e.g., bottom surface) of an upper clamp 200, according to an embodiment. Similarly, FIG. 2B is a perspective-view diagram illustrating the example slide rack 100B from a second manufacturer, engaged with the slide rack engagement surface of the upper clamp 200, according to an embodiment.

Attached to the upper clamp 200 are a plurality of sensors 210 and 220. The plurality of sensors may include one or more slide rack orientation sensors 210 and one or more slide rack feature sensors 220. In the illustrated embodiment, the plurality of sensors include a single slide rack orientation sensor 210 and two slide rack feature sensors 220A and 220B. In addition, at least one of the plurality of sensors 210 and/or 220 and/or another sensor may be configured to determine whether or not the slide rack 100 is engaged with the slide rack engagement surface of the upper clamp 200. In alternative embodiments, additional or fewer sensors may be employed.

In an embodiment, each slide rack orientation sensor 210 is configured to sense a slide rack feature 120 that indicates whether the slide rack 100 is topside-up or upside-down. Each slide rack orientation sensor 210 may be specific to a single type of slide rack 100 (e.g., 100A) or may be configured to determine the orientation of two or more types of slide racks 100 (e.g., 100A and 100B).

In an embodiment, each slide rack feature sensor 220 is configured to determine the presence or absence of at least one slide rack feature 120. In an embodiment which identifies a manufacturer and/or model of the slide rack 100 based on a plurality of slide rack features 120, two or more slide rack feature sensors 220 (e.g., 220A and 220B in the illustrated embodiment) may be used to determine which of a plurality of manufacturers manufactured the slide rack 100 and/or which of a plurality of models is present. Specifically, the combined outputs of the slide rack feature sensors 220, each representing the presence or absence of a particular slide rack feature 120 and/or one or more parameters (e.g., height, width, depth, thickness, shape, diameter, etc.) of a particular slide rack feature 120, may be used to uniquely identify each manufacturer's slide racks 100 and/or each model of slide rack 100. For example, the presence of a first slide rack feature 120 (e.g., 120E) and/or absence of a second slide rack feature 120 (e.g., 120H) may indicate that the slide rack 100A from the first manufacturer is present, whereas the absence of the first slide rack feature 120 and/or presence of the second slide rack feature 120 may indicate that the slide rack 100B from the second manufacturer is present.

In an embodiment, the digital slide scanning apparatus comprises a processor 555, which monitors each output of slide rack orientation sensor(s) 210 during slide processing, and analyzes the output(s) to determine the orientation of the slide rack 100 based on the output of slide rack orientation sensor(s) 210. In the event that the determination is performed based on the outputs from a plurality of slide rack orientation sensors 210, the processor 555 monitors the plurality of outputs from these slide rack orientation sensors 210 before and/or during slide processing. During monitoring, if the processor 555 determines that the position of the slide rack 100 has become abnormal based on the output(s) of the slide rack orientation sensor(s) 210, the processor 555 may trigger an alarm (e.g., an audio alert via a speaker of the digital slide scanning apparatus and/or a visual alert via a display or light source of the digital slide scanning apparatus) to warn an operator of the digital slide scanning apparatus that the slide rack 100 is abnormally positioned. The processor 555 may also halt any slide processing until the slide rack 100 is repositioned, such that the processor 555 determines, based on the output(s) of the slide rack orientation sensor(s) 210, that the slide rack 100 is properly positioned.

Additionally or alternatively, the processor 555 of the digital slide scanning apparatus receives each output of slide rack feature sensor(s) 220, and analyzes the output(s) to determine the presence or absence of a slide rack 100 and/or, if the slide rack 100 is determined to be present, uniquely identify the manufacturer, model, and/or other type of the slide rack 100 and/or determine whether or not usage of the slide rack 100 is supported by the digital slide scanning apparatus. If the processor 555 determines that usage of the slide rack 100 is not supported by the digital slide scanning apparatus, the processor 555 may prevent any slide processing, so as to prevent potential damage to glass slides 585 within the slide rack 100, the slide rack 100, and/or the digital slide scanning apparatus.

2. Example Slide Rack Determination Process

Figure 3:
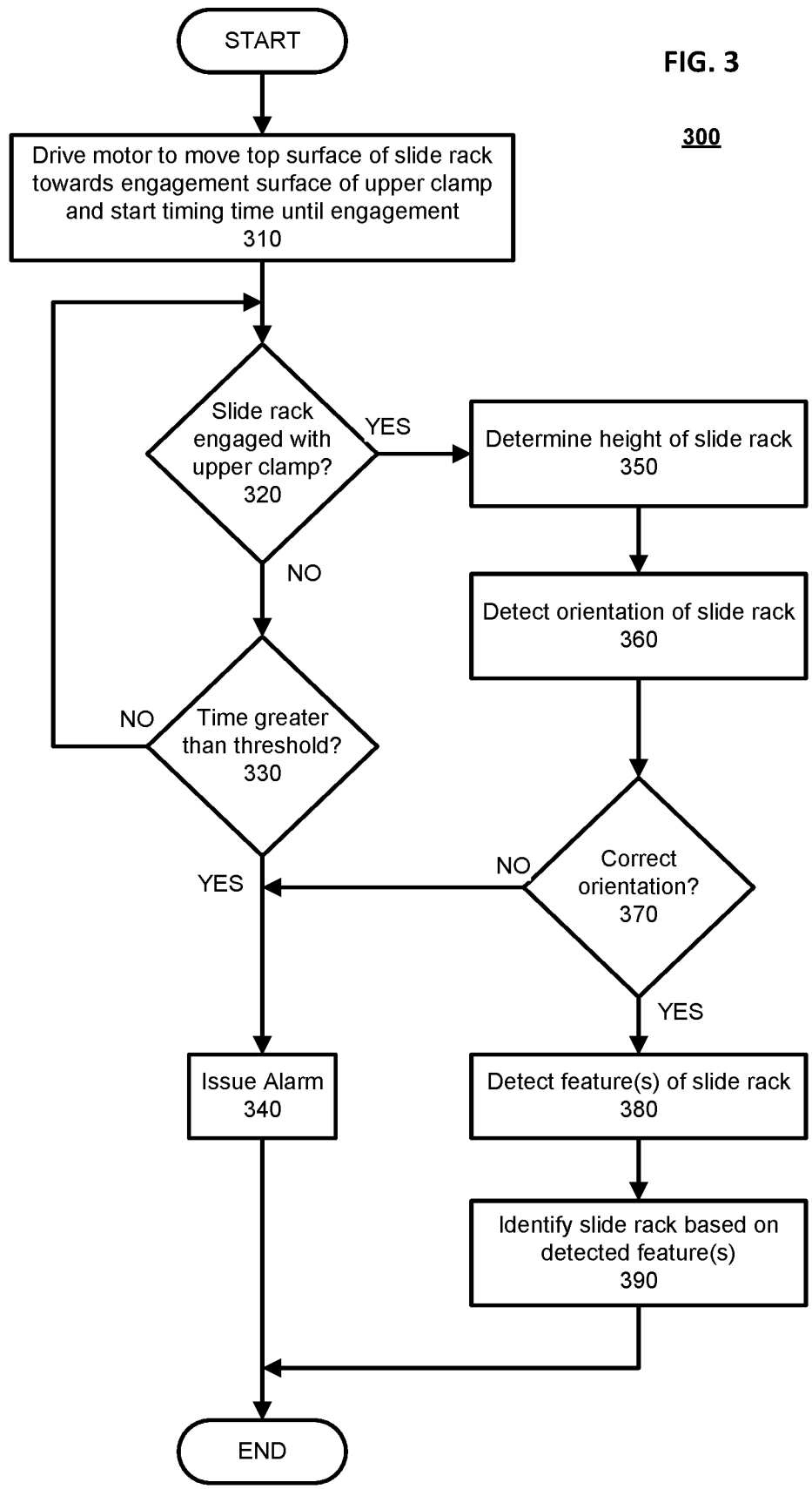
FIG. 3 is a flowchart illustrating an example process for identifying the presence, orientation, features, manufacturer, and/or model of a slide rack, according to an embodiment.

FIG. 3 is a flowchart that illustrates a process 300 for identifying the presence, orientation, features, manufacturer, and/or model of a slide rack 100, according to an embodiment. While the process 300 is illustrated with a certain arrangement and ordering of steps, the process 300 may be implemented with fewer, more, or different steps and a different arrangement and/or ordering of steps. The process 300 may be implemented by the processor 555 of a digital slide scanning apparatus, such as the scanning system 550 illustrated in FIG. 4A.

The process 300 begins in step 310, when a motor begins driving the slide rack 100, such that the engagement surface 110 (e.g., top surface) of the slide rack 100 moves toward the slide rack engagement surface (e.g., bottom surface) of the clamp 200. For instance, another engagement surface (e.g., bottom surface) of the slide rack 100 may rest on a slide rack engagement surface (e.g., top surface) of a lower clamp. The lower clamp may comprise a sensor that detects the presence of the slide rack 100, and the processor 555 may automatically activate the motor to drive the lower clamp towards the upper clamp 200 whenever the sensor detects the presence of the slide rack 100. Alternatively, an operator may manually activate the motor, under the control of the processor 555, to drive the lower clamp towards the upper clamp 200.

In addition, in step 310, the processor 555 may start monitoring a time from the activation time of the motor until an engagement time at which the engagement surface 110 of the slide rack 100 engages the slide rack engagement surface of the upper clamp 200. For example, the processor 555 may start a timer at the activation time to be stopped at the engagement time. Alternatively, the processor 555 may store an activation time at which the motor was activated and continually compare that activation time to a current time (e.g., until the engagement time).

In step 320, the processor 555 monitors an output of an engagement sensor (e.g., sensor 210, 220, or another sensor) of upper clamp 200. If the engagement sensor detects the slide rack 100, it outputs a detection indication to the processor 555. Otherwise, if the engagement sensor does not detect the slide rack, it outputs no indication or a non-detection indication to the processor 555. If the processor 555 receives the detection indication (i.e., "YES" in step 320), the process 300 proceeds to step 350. Otherwise, if the processor 555 does not receive the detection indication or receives a non-detection indication (i.e., "NO" in step 320), the process 300 proceeds to step 330.

In step 330, the processor 555 determines whether or not the time period, from the activation time in step 310 to the current time, is greater than a threshold value. The threshold value may be set to a length of time that is indicative of the absence of any slide rack 100 between the upper and lower clamps or indicative of another error. If the length of time is greater than the threshold value (i.e., "YES" in step 330), the processor 555 may issue an alarm in step 340 (e.g., an audio and/or visual alert) to notify an operator that an error was encountered. The alarm may comprise an indication of the error (e.g., the absence of a slide rack 100). Otherwise, if the length of time is not greater than the threshold value (i.e., "NO" in step 330), the process 300 may continue to monitor for engagement in step 320. It should be understood that if the length of time is equal to the threshold value, the processor 555 may issue an alarm or continue to step 320, depending on the programmer's particular design choice.

In an alternative embodiment, the processor 555 may utilize other means for detecting the absence of the slide rack 100. In such a case, step 310 could omit the start of the engagement timing and step 330 could be omitted entirely. As an example, the absence of the slide rack 100 could be detected by sensing that the engagement surface of the lower clamp is within a predetermined distance from the engagement surface of the upper clamp or has reached the engagement surface of the upper clamp.

In step 350, the processor 555 may determine the height of the slide rack 100. In an embodiment, the height of the slide rack 100 is calculated based on the time period from the activation time in step 310 to the engagement time detected in step 320. For example, the height of the slide rack 100 could be calculated based on the time period and a known constant speed of the motor activated in step 310 (e.g., height=speed×time period). Alternatively, the height of the slide rack 100 could be determined based on a distance between the lower clamp and upper clamp 200 at the time of the engagement detected in step 320. It should be understood that the height of the slide rack 100 may be utilized as a feature for identifying the manufacturer and/or model of the slide rack 100. In an embodiment in which the height of the slide rack 100 is not required to identify the manufacturer of the slide rack 100, step 350 could be omitted.

In step 360, the processor 55 may determine the orientation of the slide rack 100. For example, the processor 555 may receive an output from one or more slide rack orientation sensors 210. Based on the output from the slide rack orientation sensor(s) 210, the processor may determine the orientation of the slide rack 100. For example, the processor may determine whether the slide rack 100 is topside-up or upside-down.

In step 370, if the orientation of the slide rack 100 is incorrect or improper (i.e., "NO" in step 370), the processor 555 may issue an alarm in step 340. For example, an incorrect or improper orientation may comprise an upside-down orientation of the slide rack 100. The alarm may comprise an indication of the error (e.g., improper orientation of the slide rack 100). Otherwise, if the orientation of the slide rack 100 is correct and proper (i.e., "YES" in step 370), the process 300 proceeds to step 380.

In step 380, the processor 555 may detect one or more features of the slide rack 100. For example, the processor 555 may receive an output from one or more slide rack feature sensors 220. Based on the output from the slide rack feature sensor(s) 220 and/or other detected features (e.g., the height of the slide rack determined in step 350), the processor 555 may identify the slide rack 100 in step 390.

Specifically, in step 390, the processor 555 may identify the manufacturer and/or model of the slide rack 100. This identification may then be used for further processing by the digital slide scanning apparatus 550. For example, the identity of the manufacturer and/or model of the slide rack 100 may be used to determine whether or not the slide rack 100 is supported by the digital slide scanning apparatus 550, to configure an operation of the digital slide scanning apparatus 550, such as controlling the operation of an assembly for loading and unloading slides 585 from the slide rack 100, and/or the like.

3. Example Embodiments

In an embodiment, a slide rack determination system includes a slide rack engagement surface configured to engage a top surface of a slide rack during processing of a slide rack by a digital slide scanning apparatus. The slide rack determination system also includes at least one sensor configured to sense at least one feature of the slide rack when the slide rack is engaged with the slide rack engagement surface. The slide rack determination system also includes a processor configured to receive one or more indications from the at least one sensor and analyze the received one or more indications to determine a manufacturer of the slide rack.

In an embodiment, a slide rack determination system includes a slide rack engagement surface configured to engage a top surface of a slide rack during processing of a slide rack by a digital slide scanning apparatus. The slide rack determination system also includes at least one sensor configured to sense at least one feature of the slide rack when the slide rack is engaged with the slide rack engagement surface. The slide rack determination system also includes a processor configured to receive one or more indications from the at least one sensor and analyze the received one or more indications to determine an orientation of the slide rack.

In an embodiment, a slide rack determination system includes a motor configured to drive a slide rack along a linear axis within a digital slide scanning apparatus, wherein the motor begins driving the slide rack at a first time. The slide rack determination system also includes a slide rack engagement surface positioned along the linear axis and configured to engage a top surface of the slide rack during processing of a slide rack by the digital slide scanning apparatus. The slide rack determination system also includes at least one sensor configured to sense the engagement of the slide rack and the slide rack engagement surface, wherein the slide rack engages the slide rack engagement surface at a second time. The slide rack determination system also includes a processor configured to drive the motor, the processor further configured to determine the first time based on a start time of driving the motor, the processor further configured to receive an indication from the at least one sensor confirming the engagement of the slide rack and the slide rack engagement surface, the processor further configured to determine the second time based on the received indication, and the processor further configured to determine a height of the slide rack based on the first time and the second time. Similarly, the processor may determine an absence of a slide rack based on an elapsed amount of time after the first time, such that if the processor drives the motor longer than a predetermined amount of time, the processer determines the absence of a slide rack.

In an embodiment, a slide rack determination method includes driving a slide rack toward a slide rack engagement surface comprising a plurality of sensors, and, subsequent to engaging a top surface of the slide rack with the slide rack engagement surface, receiving an indication from the one or more sensors. The method also includes analyzing the indication from the one or more sensors and determining a slide rack manufacturer based on the analysis.

In an embodiment, a slide rack determination method includes driving a slide rack toward a slide rack engagement surface comprising a plurality of sensors, and, subsequent to engaging a top surface of the slide rack with the slide rack engagement surface, receiving an indication from the one or more sensors. The method also includes analyzing the indication from the one or more sensors and determining a slide rack orientation based on the analysis.

In an embodiment, a method includes using a motor to drive a slide rack toward a slide rack engagement surface comprising a plurality of sensors, and storing a first time corresponding to when the motor started driving the slide rack. The method also includes sensing an engagement of the slide rack with the slide rack engagement surface, and storing a second time corresponding to when the slide rack engaged with the slide rack engagement surface, and determining a slide rack height based on the analysis.

4. Example Digital Slide Scanning Apparatus

Figure 4A:
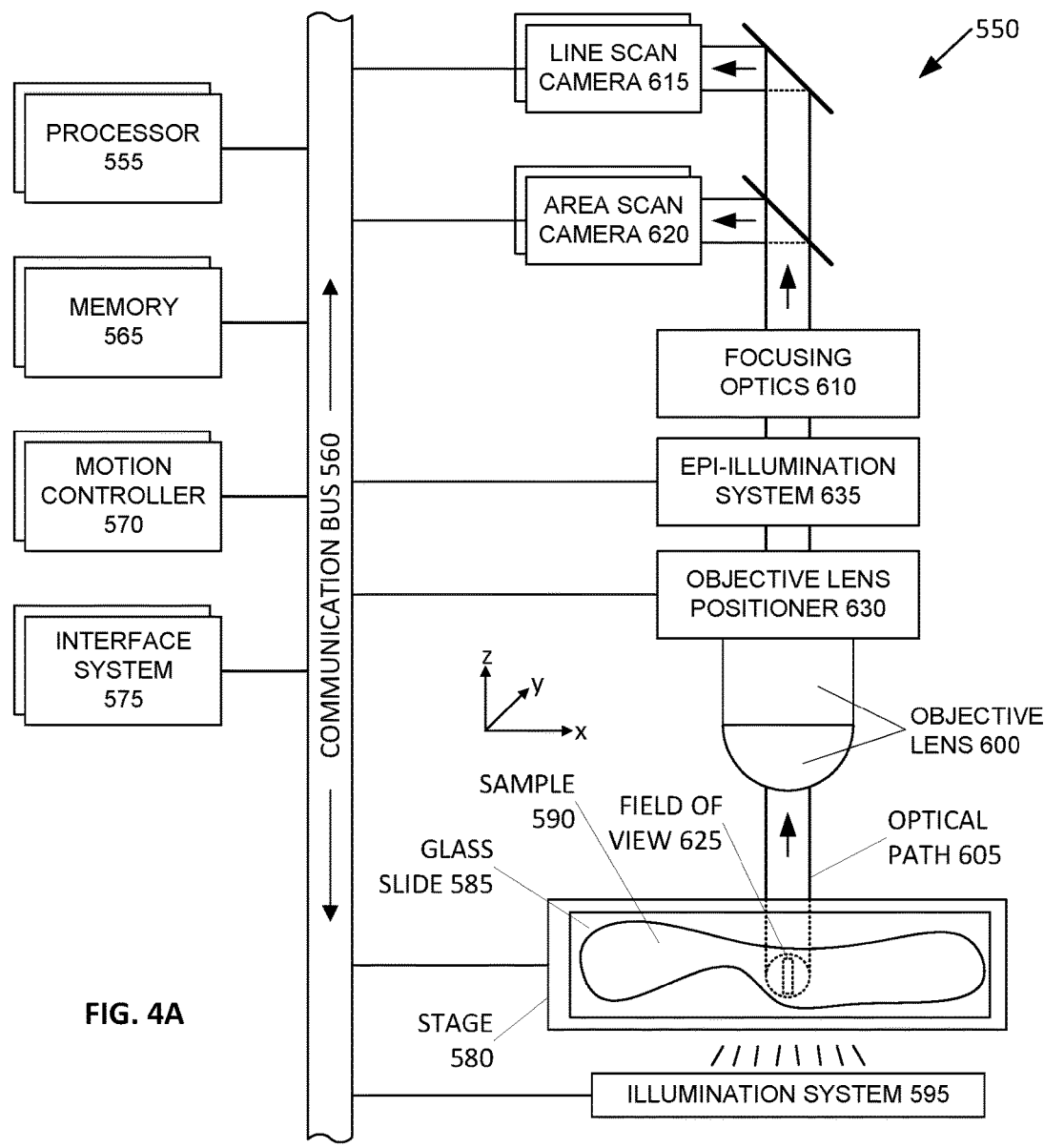
FIG. 4A is a block diagram illustrating an example processor-enabled device that may be used in connection with various embodiments described herein.

FIG. 4A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to as a digital slide scanning apparatus, digital slide scanner, scanner, scanner system, digital imaging device, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description, these elements will be described in the singular except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multi-core processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital-signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555. The one or more processors may be configured to control the motor that drives the lower clamp and further configured to receive indications from the one or more sensors attached to the upper clamp 200, and thereby control the overall workflow of the digital imaging device 550 and determine the height, manufacturer, and/or orientation of a slide rack 100 being processed by the digital imaging device 550.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, a removable storage drive, and/or the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X-Y-Z movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium, etc.) or external devices, such as an image server system, an operator station, a user station, and an administrative server system, that are connected to the scanner system 550 via a network (not shown).

The illumination system 595 is configured to illuminate a portion of the sample 590. The illumination system 595 may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively or additionally, the illumination system 595 may be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration (TDI) line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10-bit 64-linear-array TDI line scan camera. It should be noted that a variety of bit depths for the line scan camera 615 can be employed for use with a fluorescence scanner embodiment of the scanning system 550.

The movable stage 580 is configured for precise X-Y axes movement under control of the processor 555 or the motion controller 570. The movable stage may also be configured for movement in a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In an embodiment, the scanner system 550 may employ a high-precision and tightly coordinated X-Y grid to aid in the location of the sample 590 on the movable stage 580. In an embodiment, the movable stage 580 is a linear motor based X-Y stage with high precision encoders employed on both the X and the Y axes. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA, or protein that is deposited on any type of slide or other substrate, including any and all samples commonly known as microarrays. The sample 590 may be a microtiter plate, for example a 96-well plate. Other examples of the sample 590 include integrated circuit boards, electrophoresis records, petri dishes, film, semiconductor materials, forensic materials, and machined parts.

Objective lens 600 is mounted on the objective positioner 630 which, in an embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in X-Y-Z axes are coordinated and controlled in a closed loop manner using motion controller 570 under the control of the processor 555 that employs memory 565 for storing information and instructions, including the computer-executable programmed steps for overall operation of the scanning system 550.

In an embodiment, the objective lens 600 is a plan apochromatic ("APO") infinity-corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2× magnification changer allows a native 20X objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3-linear-array ("red-green-blue" or "RGB") color line scan camera or a 96-linear-array monochrome TDI may also be used. TDI line scan cameras typically provide a substantially better signal-to-noise ratio (SNR) in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1,024 pixels, and others having as many as 4,096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555, and the processed contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor, or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined together to form a contiguous digital image of a portion of the sample 590 or the entire sample 590. The scanning of the sample 590 may include acquiring vertical image stripes or horizontal image stripes. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules or other software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly (e.g., via a network).

Figure 4B:
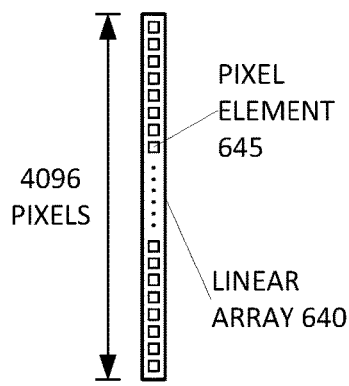
FIG. 4B is a block diagram illustrating an example line scan camera having a single linear array, according to an embodiment.

FIG. 4B illustrates a line scan camera having a single linear array 640, which may be implemented as a charge coupled device ("CCD") array. The single linear array 640 comprises a plurality of individual pixels 645. In the illustrated embodiment, the single linear array 640 has 4,096 pixels. In alternative embodiments, linear array 640 may have more or fewer pixels. For example, common formats of linear arrays include 512, 1,024, and 4,096 pixels. The pixels 645 are arranged in a linear fashion to define a field of view 625 for the linear array 640. The size of the field of view varies in accordance with the magnification of the scanner system 550.

Figure 4C:
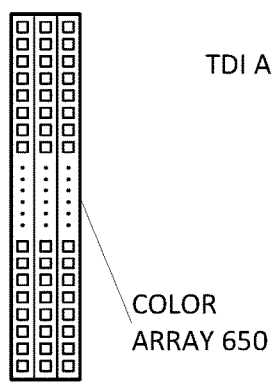
FIG. 4C is a block diagram illustrating an example line scan camera having three linear arrays, according to an embodiment.

FIG. 4C illustrates a line scan camera having three linear arrays, each of which may be implemented as a CCD array. The three linear arrays combine to form a color array 650. In an embodiment, each individual linear array in the color array 650 detects a different color intensity (e.g., red, green, or blue). The color image data from each individual linear array in the color array 650 is combined to form a single field of view 625 of color image data.

Figure 4D:
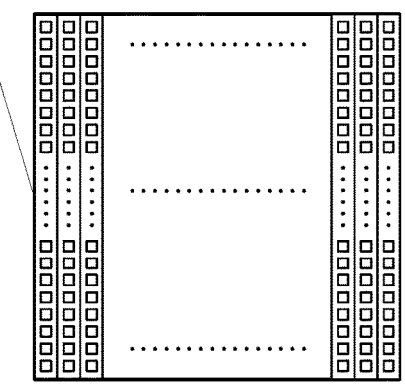
FIG. 4D is a block diagram illustrating an example line scan camera having a plurality of linear arrays, according to an embodiment.

FIG. 4D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square root of the number of linear arrays (also referred to as integration stages). A TDI line scan camera may comprise a larger variety of numbers of linear arrays. For example, common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A slide rack determination system, comprising:
    a slide rack clamp apparatus configured to hold a slide rack and having an engagement surface configured to engage an engagement surface of the slide rack during processing of the slide rack by a digital slide scanning apparatus;
    one or more sensors on the clamp apparatus configured and positioned to sense at least one feature of the slide rack while the engagement surface of the slide rack is engaged with the slide rack engagement surface, the at least one feature comprising one or more protrusions or recesses at one or more locations on a side of the slide rack or at a perimeter edge of a top surface of the slide rack, such that the at least one feature identifies the slide rack; and at least one hardware processor configured to receive an output from the one or more sensors, and, based on the received output, identify the slide rack.

2. The slide rack determination system of claim 1, wherein identifying the slide rack comprises identifying a manufacturer of the slide rack.

3. The slide rack determination system of claim 1, wherein identifying the slide rack comprises identifying a model of the slide rack.

4. The slide rack determination system of claim 1, wherein identifying the slide rack comprises determining whether or not usage of the slide rack is supported by the digital slide scanning apparatus.

5. The slide rack determination system of claim 1, wherein the at least one hardware processor is further configured to, based on the received output, determine an orientation of the slide rack.

6. The slide rack determination system of claim 1, wherein the at least one hardware processor is further configured to:

based on the received output from the one or more sensors, determine whether or not the orientation of the slide rack is improper; and, when the orientation of the slide rack is determined to be improper, initiate an alarm to alert an operator that the orientation of the slide rack is improper.

7. The slide rack determination system of claim 6, wherein the orientation of the slide rack is determined to be improper when the orientation of the slide rack is upside-down.

8. The slide rack determination system of claim 1, further comprising a motor configured to drive the slide rack along a linear axis within the digital slide scanning apparatus towards the slide rack engagement surface, wherein at least one of the one or more sensors is configured to sense an engagement between the slide rack engagement surface and the engagement surface of the slide rack, and wherein the at least one hardware processor is further configured to activate the motor, and, based on an output from the at least one sensor, deactivate the motor.

9. The slide rack determination system of claim 1, wherein the at least one feature comprises a feature on a side of the slide rack, wherein the side is orthogonal to the engagement surface of the slide rack.

10. The slide rack determination system of claim 1, wherein the at least one feature comprises a feature on a peripheral edge of the engagement surface of the slide rack.

11. The slide rack determination system of claim 1, wherein the one or more sensors comprise a plurality of sensors configured to sense a plurality of features of the slide rack, wherein the output from the plurality of sensors comprises indications of the plurality of features, and wherein identifying the slide rack based on the received output from the plurality of sensors comprises identifying a slide rack that uniquely corresponds to all of the indications of the plurality of features.

12. The slide rack determination system of claim 1, further comprising a digital slide scanning apparatus in a combined scanning and slide rack determination system, the digital slide scanning apparatus configured to scan digital slides and coordinate with the slide rack determination system to identify slide racks before, during, and/or after a scanning process performed by the digital slide scanning apparatus.

13. The scanning system of claim 12, wherein the at least one hardware processor is further configured to control an operation of a scanning process in the digital slide scanning apparatus based on the identification of the slide rack.

14. A method comprising, by at least one hardware processor of a digital slide scanning apparatus:

receiving output from one or more sensors positioned on a clamp apparatus and configured to sense at least one feature of a slide rack while an engagement surface of the slide rack is engaged with a slide rack engagement surface on the clamp apparatus of the digital slide scanning apparatus, the at least one feature comprising one or more protrusions or recesses on a side or at a top of the slide rack; and, based on the received output from the one or more sensors, identifying the slide rack.

* * * * *